June 3, 1941.  G. ROBERTS, JR  2,244,573
METHOD OF MAKING CATALYSTS
Filed July 18, 1938  2 Sheets-Sheet 1

INVENTOR
George Roberts, Jr.
BY
ATTORNEY

June 3, 1941.　　G. ROBERTS, JR　　2,244,573
METHOD OF MAKING CATALYSTS
Filed July 18, 1938　　2 Sheets-Sheet 2

INVENTOR
George Roberts, Jr.
BY
ATTORNEY

Patented June 3, 1941

2,244,573

UNITED STATES PATENT OFFICE 2,244,573

METHOD OF MAKING CATALYSTS

George Roberts, Jr., Montclair, N. J., assignor to The M. W. Kellogg Company, New York, N. Y., a corporation of Delaware Application July 18, 1938, Serial No. 219,931

4 Claims. (Cl. 252—253)

My invention relates to a method of making a catalyst and more particularly a catalyst adapted for use in the catalytic conversion of hydrocarbons, as for example, the conversion of high boiling hydrocarbons to low boiling hydrocarbons or the synthesis of hydrocarbons from mixtures of carbon monoxide and hydrogen.

Suitable catalysts for these operations are finely divided metals such as cobalt, nickel, iron, and the like, supported upon a suitable material such as kieselguhr, silica or the like.

A nickel catalyst is cheaper per pound than a cobalt catalyst, but more nickel catalyst is required. All catalysts, after a period of use, decline in activity and must be re-worked. In the case of a nickel catalyst, since greater amounts are necessary in a given operation and since its life may not be so long as cobalt catalyst, the re-working cost of a nickel catalyst is greater.

I have determined that a cobalt catalyst, having approximately the following composition is, from an economical point of view, taking into consideration the cost of re-working, an excellent one. It is understood that it is given by way of example and not by way of limitation, since my method is applicable to any suitable catalyst metal.

| | Weight (percent) |
|---|---|
| Cobalt | 32.80 |
| Thorium oxide | 5.64 |
| Kieselguhr | 61.56 |

One object of my invention is to provide a method of manufacturing a catalytic material in an economical and expeditious manner.

Another object of my invention is to provide a method of hydrolytically preparing a catalytic material.

Other and further objects of my invention will appear from the following description.

In the accompanying drawings which form part of the instant specification and are to be read in conjunction therewith and in which like reference numerals are used to indicate like parts in the various views.

Figure 1:
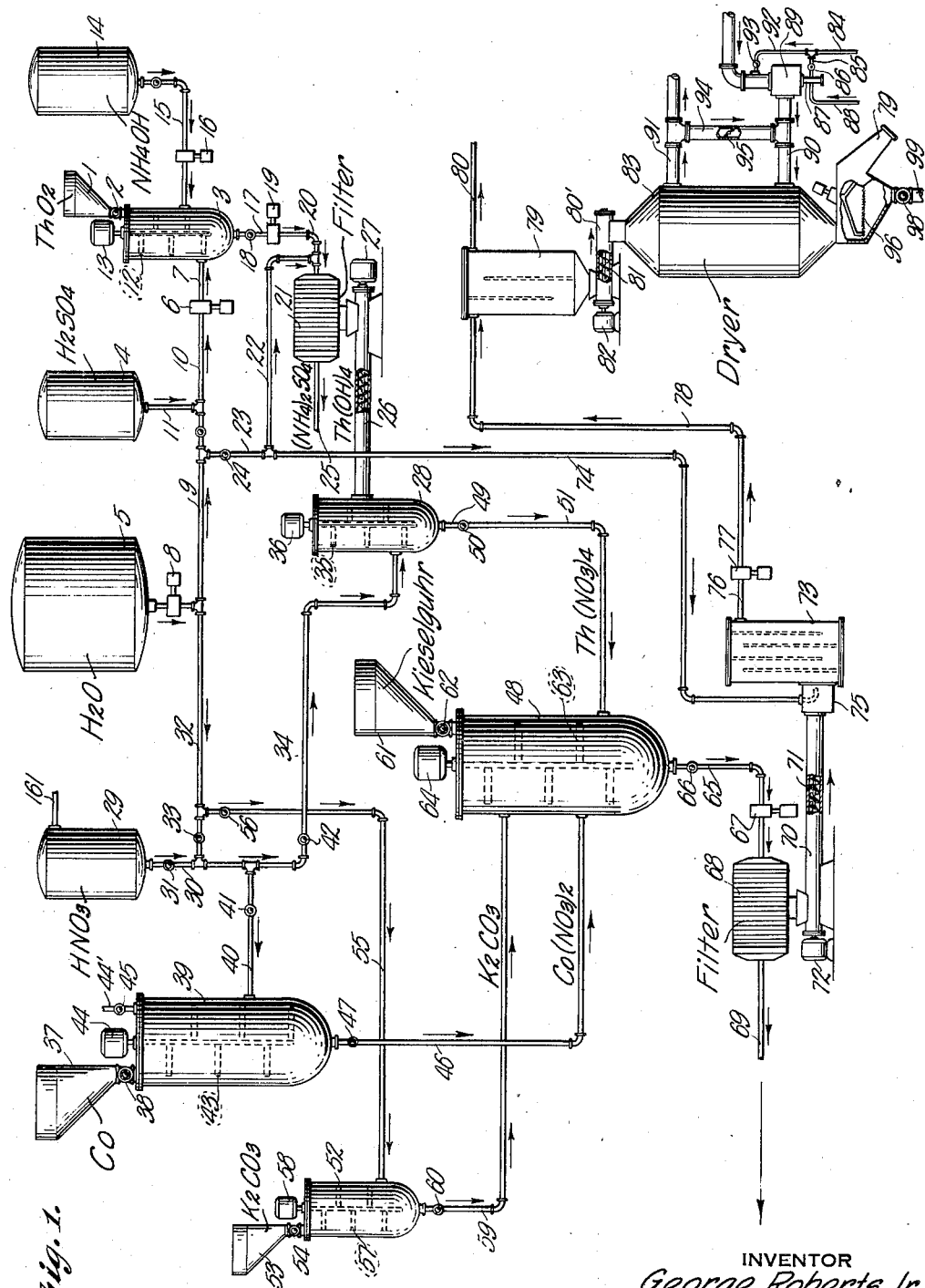
Figure 1 is a diagrammatic view of a portion of the apparatus capable of carrying out the method of my invention.

Referring now to the drawings, thorium oxide from hopper 1 is fed past valve 2 into a digester 3. Sulphuric acid from tank 4 is diluted with water from tank 5 and pumped by pump 6 through pipe 7 into the digester 3. Ten percent excess dilute sulphuric acid is used. The dilution is controlled by pump 8 which pumps water through pipe 9 into the pipe 10 into which sulphuric acid passes from tank 4 through pipe 11. The digester is provided with agitating means 12 operated by any suitable means such as a motor 13. The following reaction will take place between the thorium oxide and the sulphuric acid:

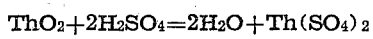
$$ThO_2 + 2H_2SO_4 = 2H_2O + Th(SO_4)_2$$

When the solution is complete, 15 percent aqueous ammonia from tank 14 is pumped through line 15 by pump 16 and agitation continued to cause precipitation of thorium hydroxide as follows:

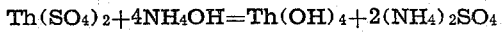
$$Th(SO_4)_2 + 4NH_4OH = Th(OH)_4 + 2(NH_4)_2SO_4$$

The slurry is then withdrawn from the digester 3 through pipe 17, controlled by valve 18 and pumped by pump 19 through pipe 20 through a plate and frame filter press 21. If desired, slurry may be diluted with water to wash it as it is being introduced into the filter. For this purpose, water pumped by pump 8 may pass through line 9 past valve 24 through line 23 through pipe 22 into pipe 20.

The ammonium sulphate in solution is withdrawn from the filter through pipe 25. The thorium hydroxide is withdrawn from the filter and conveyed by conveyor 26 operated by motor 27 into a digester 28. Nitric acid stored in tank 29 flows through pipe 30 controlled by valve 31 and is diluted by water from pipe 32 controlled by valve 33 and passes through pipe 34 into the digester 28, about ten percent excess of dilute nitric acid being used. The thorium hydroxide and dilute nitric acid are agitated in digester 28 by agitating means 35 operated by motor 36 until solution is effected as follows:

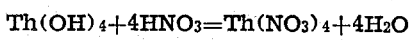
$$Th(OH)_4 + 4HNO_3 = Th(NO_3)_4 + 4H_2O$$

Simultaneously with the solution of thorium oxide, metallic cobalt from hopper 37 is introduced past valve 38 into the digester 39 into which is also introduced 10 percent of 25 percent nitric acid through pipe 40, the nitric acid being taken from the nitric acid tank 29 and being diluted by water from pipe 32, valve 41 being opened and valve 42 being closed. The digester 39 is provided with agitating means 43 operated by a motor 44.

In the digester 39 a reaction will take place, which is assumed to be as follows:

$$3Co + 8HNO_3 = 4H_2O + 3Co(NO_3)_2 + 2NO$$

It is impossible to write the exact equation because other oxides of nitrogen may be given off. The oxides of nitrogen may be vented through pipe 44' controlled by valve 45. If desired, the oxides of nitrogen may be used to form nitric acid.

The excess acid in both the cobalt nitrate and thorium nitrate solutions formed in digesters 39 and 28 respectively is neutralized with potassium carbonate. The cobalt nitrate solution is withdrawn from the digester 39 through pipe 46 controlled by valve 47 and introduced into a tank 48. The thorium nitrate solution formed in digester 28 is withdrawn through pipe 49 controlled by valve 50 and passed through pipe 51 into the tank 48. A solution of potassium carbonate is made in tank 52, potassium carbonate being introduced from a hopper 53 controlled by a valve 54 and water being introduced through pipe 55 controlled by valve 56. The tank 52 is provided with agitating means 57 operated by an electric motor 58. The potassium carbonate solution is withdrawn from the mixing tank 52 through pipe 59 controlled by valve 60 and introduced in desired amounts into the tank 48. Kieselguhr from hopper 61 is introduced into the tank 48 through valve 62. The tank 48 is provided with an agitating means 63 operated by an electric motor 64. It is to be understood that any other suitable support for the catalytic material may be employed such as finely divided clays, silica or the like, which would be introduced from hopper 61 instead of the kieselguhr.

The potassium carbonate is introduced into a tank 48 through line 59. During the precipitation, the agitation is very thorough in order to insure a uniform product. As will be clear from the process hereinafter described, potassium carbonate may be used for precipitation while consuming only the cheaper sodium carbonate. Potassium carbonate gives better results than sodium carbonate and produces a more active catalyst. The reason for this is unknown. While I do not wish to be bound by any theory, this may be because the sodium ions are adsorbed and subsequently decrease catalyst activity. In the tank 48 the following reactions occur:

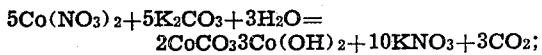
$$5Co(NO_3)_2 + 5K_2CO_3 + 3H_2O =$$
$$2CoCO_3 \cdot 3Co(OH)_2 + 10KNO_3 + 3CO_2;$$

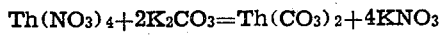
$$Th(NO_3)_4 + 2K_2CO_3 = Th(CO_3)_2 + 4KNO_3$$

Figure 2:
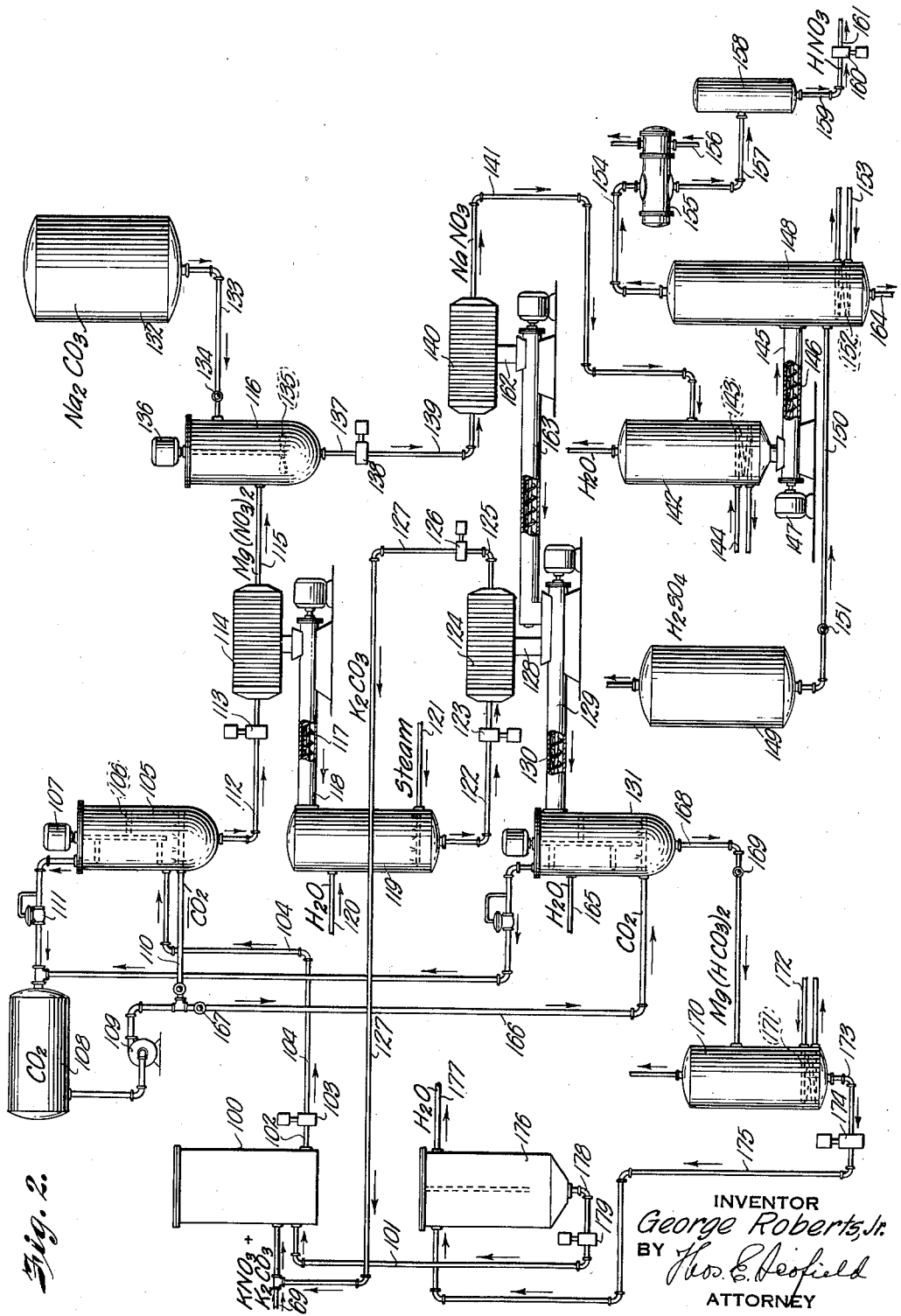
Figure 2 is a diagrammatic view of the remaining portion of apparatus capable of carrying out the method of my invention.

The slurry formed in tank 48 is withdrawn through pipe 65 controlled by valve 66 and pumped by pump 67 through a plate and frame filter press 68. The filtrate containing a solution of potassium nitrate and potassium carbonate is withdrawn from the filter 68 through pipe 69 for passage to the nitric acid and potassium carbonate recovery operations shown in Figure 2. The filter cake comprising a mixture of basic cobalt carbonate ($2CoCO_3 \cdot 3Co(OH)_2$) and thorium carbonate precipitated on the carrier, kieselguhr, is withdrawn from the filter and conveyed through duct 70 provided with a conveyor screw 71 operated by a motor 72 to a washer 73, water being introduced into the washer through pipe 74 into a mixing chamber 75. The washer may be of any suitable type.

The slurry is withdrawn from the washer through pipe 76 and pumped by pump 77 through pipe 78 to a settler 79 from which the washing water is withdrawn through pipe 80. The washed material is withdrawn from the settler 79 and conveyed through duct 80' by augur 81, operated by motor 82, to a drier 83, which may be of any suitable construction. Air from any suitable source passes through pipe 84, through pipe 85 controlled by valve 86 into a burner 87 which is provided with gaseous fuel through pipe 88. The fuel and air burn in chamber 89 and the products of combustion pass through duct 90, through the drier and are withdrawn therefrom through pipe 91. Excess air may pass through pipe 92 controlled by valve 93 to control the temperature. The temperature may be further controlled by recycling the exhaust gases from the drier through duct 94 controlled by damper 95. The dried material leaves the drier and passes to a vibrating screen 96, the fines being withdrawn through pipe 97 controlled by valve 98. The dried particles are withdrawn through spout 99. These particles are then put in the catalyst chambers where the carbonates are decomposed with hot air as follows:

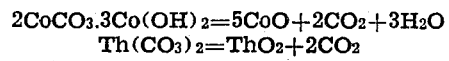
$$2CoCO_3 \cdot 3Co(OH)_2 = 5CoO + 2CO_2 + 3H_2O$$
$$Th(CO_3)_2 = ThO_2 + 2CO_2$$

The cobalt oxide is then reduced with hydrogen at 800° F. as follows:

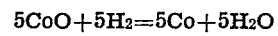
$$5CoO + 5H_2 = 5Co + 5H_2O$$

The thorium oxide is not reducible at this temperature so that the resulting catalyst will be the kieselguhr containing metallic cobalt and thorium oxide which seems to promote the action of the cobalt catalyst.

As pointed out above, this catalyst is particularly adapted for the synthesis of hydrocarbons from mixtures of carbon monoxide and hydrogen though it is to be understood that it may be employed for any suitable operation in which a finely divided metal deposited upon a carrier is desired. Instead of cobalt, I may use nickel, iron or any other suitable metal from which the nitrate may be formed by interaction with nitric acid and which, further, is suitable as a catalyst, employing the reactions analogous to those pointed out above as will be readily understood by those skilled in the art.

From the foregoing it will be clear that my process enables nitric acid to be used in preparing the initial solutions, while consuming only the cheaper sulphuric acid. It is only necessary that the acid will form a metallic salt which will react with a carbonate to form the metal carbonate for decomposition to the oxide, followed by its reduction to the metal.

I prefer to use nitric acid in the confection of a cobalt catalyst because cobalt does not readily dissolve in sulphuric acid, for example, and further, the presence of sulphur tends to poison the catalyst in a synthesis reaction.

Nitric acid is considerably more expensive than sulphuric acid and potassium carbonate is more expensive than sodium carbonate. The nitric acid and the potassium carbonate are used to form intermediate products and I propose to recover these for reuse.

The filtrate withdrawn from the filter 68 through pipe 69 contains an excess of potassium carbonate in solution and potassium nitrate. This flows through pipe 69 to tank 100. Magnesium carbonate slurry, previously separated in the process, as will be hereinafter pointed out, is introduced into tank 100 through pipe 101.

The magnesium carbonate, potassium carbonate and potassium nitrate is withdrawn from tank 100 through pipe 102 and pumped by pump 103 through pipe 104 into a mixer 105 provided with agitating means 106 driven by an electric motor 107. Carbon dioxide from tank 108 is pumped by pump 109 through pipe 110 and introduced into the mixing chamber 105 which is maintained under moderate pressure by back pressure controlled valve 111. The potassium is precipitated as a double salt according to the following reaction:

$$3(MgCO_3.3H_2O) + 2KNO_3 + CO_2 = Mg(NO_3)_2 + 2(KHCO_3.MgCO_3.4H_2O)$$

The double salt is insoluble.

The slurry formed in mixing chamber 105 is withdrawn therefrom through pipe 112 and pumped by pump 113 through filter press 114, the filtrate containing magnesium nitrate in solution which is withdrawn through pipe 115 and passed to mixer chamber 116. The filter cake containing potassium acid carbonate and magnesium carbonate is passed by conveyor screw 117 through duct 118 into tank 119 into which water through pipe 120 is introduced. The solution is heated by steam introduced through pipe 121 to break up the double salt and put potassium carbonate into solution. The slurry is withdrawn from the tank 119 through pipe 122 and pumped by pump 123 through filter press 124, filtrate containing potassium carbonate in solution being withdrawn through pipe 125 for pumping by pump 126 through pipe 127 for passage to the tank 100 through pipe 69. The filter cake containing the magnesium carbonate is withdrawn from the filter 124 through duct 128 and conveyed through duct 129 by conveyor screw 130 to the mixer 131. To the magnesium nitrate solution entering tank 116 is added a solution of sodium carbonate withdrawn from tank 132 through pipe 133 controlled by valve 134. The magnesium nitrate and the sodium carbonate solution are agitated by a mixer 135 operated by a motor 136. The following reaction takes place:

$$4Mg(NO_3)_2 + 4Na_2CO_3 + 5H_2O = (3MgCO_3.Mg(OH)_2.3H_2O) + 8NaNO_3 + H_2O + CO_2$$

The slurry is withdrawn from tank 116 through pipe 137 and is pumped by pump 138 through pipe 139 to the filter press 140, the filtrate containing sodium nitrate being withdrawn through pipe 141 for passage to the evaporator 142 in which the water is evaporated by heat supplied through a coil 143 by means of steam introduced through pipe 144. Dried sodium nitrate is conveyed through duct 145 by means of conveyor screw 146 operated by a motor 147 into a retort 148 into which is introduced 95 percent sulphuric acid from tank 149, through pipe 150 controlled by valve 151. The sodium nitrate and the sulphuric acid react to form nitric acid as follows:

$$NaNO_3 + H_2SO_4 = NaHSO_4 + HNO_3$$

This reaction is well known and has a broad commercial background. The nitric acid is distilled from the retort 148 by means of heat supplied to a coil 152 by suitable heating medium or by external heating. Nitric acid vapors pass overhead through pipe 154 and are condensed in condenser 155 to which a cooling medium is supplied through pipe 156. The condensate is withdrawn from the condenser 155 through pipe 157 and collected in an accumulator tank 158 from which it is withdrawn through pipe 159 and pumped by pump 160 to pipe 161, to the nitric acid storage tank 29 shown in Figure 1. The sodium acid sulphate sludge is withdrawn from retort 148 through pipe 164 and is discarded.

The filter cake from filter press 140 comprising magnesium carbonate and magnesium hydroxide is withdrawn through duct 162 and conveyed through duct 163 for passage through duct 129 with the magnesium carbonate filter cake from filter 124 into the mixing chamber 131.

The filter cakes are put in the solution with carbon dioxide and water with the aid of vigorous mechanical agitation. Water is introduced into the mixing chamber 131 through pipe 165 and carbon dioxide is passed into the chamber 131 through pipe 166 controlled by valve 167. The following reaction will take place:

$$3MgCO_3:Mg(OH)_2.3H_2O + 5H_2CO_3 = 4Mg(HCO_3)_2 + 5H_2O$$

The solution is withdrawn from the chamber 131 through pipe 168 controlled by valve 169 and passed into boiler 170 which is heated by steam coil 171 to which steam is introduced through pipe 172. The solution is boiled in boiler 170 with the resulting precipitation of magnesium carbonate in accordance with the following reaction:

$$4Mg(HCO_3)_2 + 8H_2O = 4MgCO_3.3H_2O + 4CO_2$$

The slurry containing the water and the magnesium carbonate in suspension is withdrawn from the pump 170 through pipe 173 and pumped by pump 174 through pipe 175 into a settler 176 from which water is decanted off through pipe 177. The thickened slurry containing magnesium carbonate is withdrawn from the settler through pipe 178 and pumped by pump 179 through pipe 101 into the tank 100 as the magnesium carbonate previously separated in the process.

By my method I am enabled to recover 95 percent of the potassium carbonate, about 90 percent of the magnesium carbonate and about 80 percent of nitric acid, based on the nitrate radical present in the potassium nitrate.

It will be seen that I have accomplished the objects of my invention. I have provided an expeditious method of preparing catalysts comprising finely divided metals supported upon a siliceous material such as kieselguhr, silica or the like by hydrolytically depositing the metal carbonate upon the support, which carbonate can be easily decomposed to the metal oxide which is subsequently reduced to the metal.

By means of my process, the only nitric acid required is to make up the loss in the form of oxides of nitrogen and the only potassium carbonate is that required to make up for losses.

My appliance may be used for re-working an old catalyst by dissolving the catalyst in nitric acid to form the metal nitrate followed by processing the same as in the case of a new catalyst.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of forming a catalyst comprising a finely divided metal deposited upon a support including the steps of forming a solution of the desired catalyst metal in nitric acid comprising a portion previously recovered in the process, suspending a finely divided inert siliceous catalyst support in said solution, precipitating the carbonate of the metal upon the support and forming a corresponding amount of potassium nitrate by the addition of potassium carbonate to the solution, separating the support together with the precipitated metal carbonate from the solution of potassium nitrate, drying and heating said separated support and carbonate to decompose the carbonate to form the oxide of the metal in place upon the support, reducing the oxide to form the metal in finely divided form disseminated upon the support, adding magnesium carbonate to the filtrate containing potassium nitrate to form magnesium nitrate, reacting sodium carbonate with the magnesium nitrate to form sodium nitrate, reacting the sodium nitrate with sulfuric acid to form nitric acid, and returning the nitric acid to the process.

2. A method of forming a catalyst comprising a finely divided metal deposited upon a support including the steps of forming a solution of the desired catalyst metal in nitric acid comprising a portion previously recovered in the process, suspending a finely divided inert siliceous catalyst support in said solution, precipitating the carbonate of the metal upon the support and forming a corresponding amount of potassium nitrate by the addition of potassium carbonate to the solution, separating the support together with the precipitated metal carbonate from the solution of potassium nitrate, drying and heating said separated support and carbonate to decompose the carbonate to form the oxide of the metal in place upon the support, reducing the oxide to form the metal in finely divided form disseminated upon the support, adding magnesium carbonate and carbon dioxide to the solution containing potassium nitrate to form soluble magnesium nitrate and an insoluble magnesium potassium magnesium carbonate, separating the potassium magnesium carbonate from the solution of magnesium nitrate, reacting sodium carbonate with the magnesium nitrate to form sodium nitrate, reacting the sodium nitrate with sulfuric acid to form nitric acid, returning the nitric acid to the process for reuse in forming a solution of the catalyst metal, mixing water with the potassium magnesium carbonate and heating the mixture to decompose said carbonate to form soluble potassium carbonate and insoluble magnesium carbonate, and separating and returning the thus formed potassium carbonate for reuse in said precipitating step.

3. A method of forming a catalyst adapted for use in the synthesis of hydrocarbons from mixtures of carbon monoxide and hydrogen, said catalyst comprising cobalt supported upon kieselguhr bearing a thorium oxide promoter which includes the steps of forming a solution of cobalt nitrate by the interaction of nitric acid and cobalt, simultaneously forming thorium hydroxide by the interaction of thorium sulphate and ammonia, reacting thorium hydroxide and nitric acid to form thorium nitrate, agitating the solution of cobalt nitrate and thorium nitrate with kieselguhr, precipitating cobalt carbonate and thorium carbonate from the agitated mixture upon the kieselguhr forming a corresponding amount of potassium nitrate by addition of potassium carbonate, separating the kieselguhr, and cobalt carbonate and thorium carbonate precipitated thereon from the potassium nitrate solution, passing the potassium nitrate solution to a recovered nitric acid recovery operation, returning the nitric acid to the process, drying the kieselguhr-cobalt carbonate-thorium carbonate precipitate, heating the precipitate to decompose the thorium and cobalt carbonates to cobalt oxide and thorium oxide respectively, subjecting the mixture of metal oxides upon the kieselguhr to a reduction step to reduce the cobalt oxide to metallic cobalt, the thorium oxide being irreducible under the conditions of the reducing step whereby the desired catalyst is formed.

4. A method as in claim 3 wherein said nitric acid recovery operation comprises agitating the potassium nitrate filtrate and magnesium carbonate in the presence of carbon dioxide to form magnesium nitrate and insoluble potassium magnesium carbonate, separating the potassium magnesium carbonate from the magnesium nitrate solution, reacting the magnesium nitrate in solution filtrate with sodium carbonate to form sodium nitrate and magnesium carbonate, separating the solution of sodium nitrate from the magnesium carbonate, evaporating the sodium nitrate solution to dryness, and reacting the sodium nitrate with sulphuric acid to form nitric acid.

GEORGE ROBERTS, Jr.

CERTIFICATE OF CORRECTION.

Patent No. 2,244,573.   June 3, 1941.

GEORGE ROBERTS, JR.

It is hereby certified that error appears in the printed specification of the above numbered patent requiring correction as follows: Page 3, first column, line 23, for "carbonate- and" read -- carbonate -- --; page 4, second column, line 23, claim 3, strike out the comma after "kieselguhr"; line 27, same claim, strike out "recovered" and insert the same before "nitric" in line 28, same claim 3; and that the said Letters Patent should be read with this correction therein that the same may conform to the record of the case in the Patent Office.

Signed and sealed this 12th day of August, A. D. 1941.

(Seal)

Henry Van Arsdale,
Acting Commissioner of Patents.